US008321809B2

(12) United States Patent
Eom

(10) Patent No.: US 8,321,809 B2
(45) Date of Patent: Nov. 27, 2012

(54) APPARATUS AND METHOD FOR DISPLAYING VARIABLE-SIZED, GROUPED DISPLAY INFORMATION ON TOUCH SCREEN

(75) Inventor: Ju-il Eom, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 803 days.

(21) Appl. No.: 11/763,461

(22) Filed: Jun. 15, 2007

(65) Prior Publication Data

US 2008/0082920 A1     Apr. 3, 2008

(30) Foreign Application Priority Data

Sep. 28, 2006  (KR) .................. 10-2006-0095017

(51) Int. Cl.
*G06F 3/00*       (2006.01)
*G06F 3/153*      (2006.01)
*G06F 3/033*      (2006.01)
*G06F 3/041*      (2006.01)
*G09G 5/30*       (2006.01)
*G09G 5/00*       (2006.01)

(52) U.S. Cl. ........ 715/792; 715/788; 715/789; 715/790; 715/791; 715/793; 715/794; 715/795; 715/797; 715/798; 715/799; 345/671; 345/173

(58) Field of Classification Search .......... 715/788–799; 345/671, 173
See application file for complete search history.

(56) References Cited

U.S. PATENT DOCUMENTS

| 5,487,143 | A  | * | 1/1996  | Southgate ...................... 715/790 |
| 5,771,042 | A  | * | 6/1998  | Santos-Gomez ............. 715/800 |
| 5,880,725 | A  | * | 3/1999  | Southgate ...................... 715/790 |
| 5,917,492 | A  | * | 6/1999  | Bereiter et al. ................ 715/854 |
| 6,141,007 | A  | * | 10/2000 | Lebling et al. ................ 715/792 |
| 6,154,194 | A  | * | 11/2000 | Singh ............................ 715/788 |
| 6,295,372 | B1 | * | 9/2001  | Hawkins et al. .............. 345/156 |
| 6,310,631 | B1 | * | 10/2001 | Cecco et al. ................... 715/792 |
| 6,724,403 | B1 | * | 4/2004  | Santoro et al. ................ 715/765 |
| 6,850,255 | B2 | * | 2/2005  | Muschetto .................... 715/788 |

(Continued)

FOREIGN PATENT DOCUMENTS

JP      2001-255933 A      9/2001

(Continued)

OTHER PUBLICATIONS

Chinese Office Action, issued Jun. 30, 2011 in corresponding Chinese Patent Application No. 200710170121.0.

*Primary Examiner* — Jordany Nunez
(74) *Attorney, Agent, or Firm* — Sughrue Mion, PLLC

(57) ABSTRACT

A method and apparatus for displaying grouped display information by variable sizevariable-sized, grouped display information on a touch screen are provided. The apparatus includes an input unit that receives input from a user on a touch screen on which several pieces of display information are grouped and displayed in a predetermined number of groups, a determination unit that determines which group was input by calculating a location on the touch screen with respect to the user's input, and a display unit that displays the several pieces of display information in groups, and changes a size of the group region input as a result of the determination and the size of the other groups corresponding to the input group region size.

33 Claims, 12 Drawing Sheets

U.S. PATENT DOCUMENTS

| | | | |
|---|---|---|---|
| 2002/0154168 A1* | 10/2002 | Ijas et al. | 345/764 |
| 2002/0196287 A1* | 12/2002 | Taylor et al. | 345/792 |
| 2004/0196267 A1* | 10/2004 | Kawai et al. | 345/173 |
| 2006/0020903 A1* | 1/2006 | Wang et al. | 715/792 |
| 2006/0020904 A1* | 1/2006 | Aaltonen et al. | 715/850 |
| 2006/0036955 A1* | 2/2006 | Baudisch et al. | 715/747 |
| 2006/0044283 A1 | 3/2006 | Eri et al. | |
| 2009/0046075 A1* | 2/2009 | Kim et al. | 345/173 |

FOREIGN PATENT DOCUMENTS

| | | |
|---|---|---|
| JP | 2002-297293 A | 10/2002 |
| JP | 2004-145791 A | 5/2004 |
| JP | 2005-202611 A | 7/2005 |
| KR | 1020030088374 A | 11/2003 |

* cited by examiner

FIRST GROUP

GROUP FOR DISPLAYING INFORMATION ON THE CURRENTLY-PLAYING SONG

SECOND GROUP

GROUP FOR DISPLAYING PROPERTY OF THE CURRENTLY-PLAYING SONG

THIRD GROUP

GROUP FOR CONTROLLING SOUND-SOURCE REPRODUCTION

3:1:1

2:2:1

2:1:2

1:3:1

1:2:2

1:1:3

APPARATUS AND METHOD FOR DISPLAYING VARIABLE-SIZED, GROUPED DISPLAY INFORMATION ON TOUCH SCREEN

CROSS-REFERENCE TO RELATED APPLICATION

This application is based on and claims priority from Korean Patent Application No. 10-2006-0095017 filed on Sep. 28, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to displaying variable-sized, grouped display information on a touch screen and, more particularly, to a method and apparatus for displaying variable-sized, grouped display information on a touch screen, the method including displaying several pieces of information in groups, and variably changing the size of the groups when a user inputs a group, thereby providing the information desired by the user.

2. Description of the Related Art

Flash memory is widely used in mobile digital devices such as mobile phones, PDAs, MP3 players, navigation devices, digital cameras. As such, there is great demand for a low-priced flash memory.

The currently used flash memory is a single level cell (hereinafter, referred to as "SLC") NAND wherein each cell can contain 1 bit of information. However, the multilevel cell ("MLC") NAND flash memory, wherein each cell can contain several bits, is superior to the SLC NAND flash memory in price and capacity, and is therefore becoming more popular.

In order to make devices, such as MP3 players, portable multimedia players (PMPs), personal digital assistants (PDAs), and a ultra mobile PCs (UMPCs) smaller and lighter, touch screens, which enable a user to use his/her finger or a pointed object to input information and eliminate the need for additional devices or buttons, are used.

The size of the touch screen decreases as the apparatus becomes smaller and lighter, whereas display information requirements are increasing.

Accordingly, due to the size limitation, several pieces of display information and buttons are arranged on a display. As a result, users have difficulty understanding and controlling the interface.

In addition, the small touch screen creates user interface problems, and as a result misoperations frequently occur.

SUMMARY OF THE INVENTION

The present invention has been conceived to solve the aforementioned problem. An aspect of the present invention is to improve the convenience of operating the device, and reduce mistakes caused by the malfunction through the method of displaying several pieces of display information in groups on a touch screen, magnifying the information that the users want and reducing the information that they do not want when the user inputs a predetermined group, and displaying several pieces of display information on a small touch screen.

This and other features and aspects of the present invention will become clear to those skilled in the art upon review of the following description, attached drawings and appended claims.

There is provided an apparatus for displaying variable-sized, grouped display information on a touch screen, the apparatus including an input unit that receives input from a user on a touch screen on which several pieces of display information are grouped and displayed in a predetermined number of groups, a determination unit that determines which group was input by calculating location on the touch screen with respect to the user's input, and a display unit that displays the several pieces of display information in groups, and changes the size of the group region input as a result of the determination while the size of one of the other rest groups changing corresponding to the input group region size.

There is provided a method of displaying variable-sized, grouped display information on a touch screen, the method including: grouping several pieces of display information and dividing them in a predetermined number of group regions on a touch screen, receiving the input of one group region selected among a predetermined number of group regions on the touch screen, and changing the size of the input group region while the size of one of the other rest groups change corresponding to the input group region size. There is also provided a method of displaying variable-sized, grouped display information on a touch screen, the method including: grouping several pieces of display information and dividing them in a predetermined number of group regions on a touch screen, receiving information on either execution control or change of the region size, and performing the function corresponding to the execution control if the input was performed for the execution control or changing the size of the input group region if the change-of-size command is input while the size of one of the other rest groups changes corresponding to the input group region size.

BRIEF DESCRIPTION OF THE DRAWINGS

The above and other features and aspects of the present invention will become apparent by describing in detail exemplary embodiments thereof with reference to the attached drawings in which.

DETAILED DESCRIPTION OF EXEMPLARY EMBODIMENTS

Figure 1:
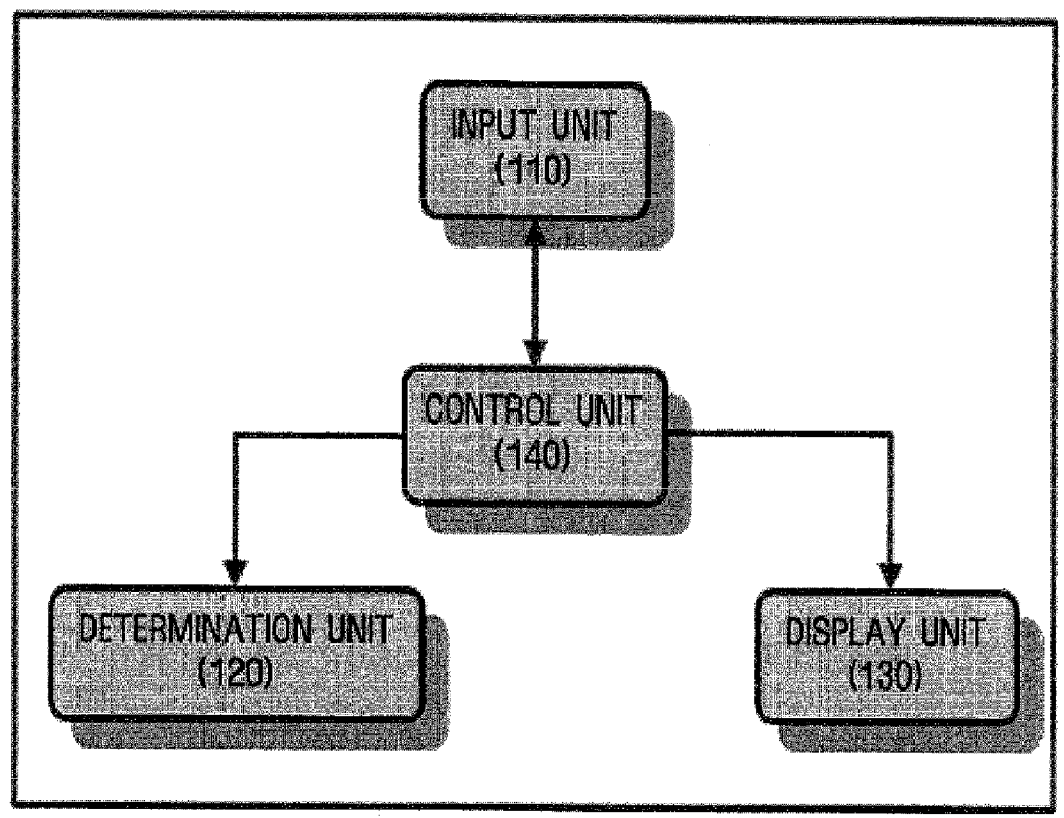
FIG. 1 illustrates an inner block diagram of an apparatus for displaying variable-size, grouped information on a touch screen according to an exemplary embodiment of the present invention.

The present invention will now be described more fully with reference to the accompanying drawings, in which exemplary embodiments of the invention are shown.

Aspects and features of the aspects of the present invention and methods of accomplishing the same may be understood more readily by reference to the following detailed description of exemplary embodiments and the accompanying drawings. The aspects of the present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, a detailed description will follow with reference to figures in order to describe a method and apparatus for displaying variable-sized, grouped display information on a touch screen.

FIG. 1 illustrates an inner block diagram of an apparatus for displaying variable-sized grouped information on a touch screen according to an exemplary embodiment of the present invention. As illustrated, the apparatus for displaying variable-sized, grouped display information on a touch screen according to an exemplary embodiment of the present invention includes an input unit 110, a determination unit 120, a display unit 130, and a control unit 140.

The input unit 110 receives input from a user by detecting touch from objects such as a user's finger or a touch pen on a touch screen. Here, the input unit 110 receives the signal generated by a touch sensor (not illustrated). The touch sensor may be operated through a variety of methods, such as a decompressed method of detecting pressure applied to the surface of a touch screen through densely installed sensor lines, or an electrostatic method of detecting touch, after electric charge (current) is generated on the surface of a screen, and sensors around the electric charge detect touch by detecting the degree of the electric charge lost when the surface is touched.

The determination unit 120 can determine which group was detected on a touch screen on which several pieces of grouped display information are displayed. It can be determined which group was selected by a user among the groups displayed on the touch screen by determining the touched location (in the case of clicking) and change of the touched location (in the case of dragging) detected by the input unit 110. An explanation of how several pieces of display information are grouped and displayed in an exemplary embodiment of the invention will follow with reference to FIGS. 2 and 3.

The determination unit 120 can further determine which area was detected between a group-sized modification area 160a, 160b or an execution area 165 formed in the group region. Here, the modification area 160a, 160b refers to an area for modifying the group size input on the touch screen by a user, and the execution area 165 refers to an area formed on a volume-controlling bar, a play button, and a stop button allowing devices, such as MP3 players, PDAs, and PMPs according to an exemplary embodiment the present invention, to be controlled according to the user's intention. A detailed description of this procedure will follow with reference to FIGS. 9 and 10.

The display unit 130 groups several pieces of display information and displays them on a touch screen, and, if the determination unit 120 determines that the region in a certain group is selected, the display unit 130 displays several pieces of display information by changing size of the group region selected by the user. For example, the size of the detected group region may be made bigger, and the size of one of the rest groups may be made smaller.

The control unit 140 controls operation of each functional block (110 to 130) included in the apparatus of an exemplary embodiment of the present invention.

The term "unit", as used herein, means, but is not limited to, a software or hardware component, such as a Field Programmable Gate Array (FPGA) or an Application Specific Integrated Circuit (ASIC), which performs certain tasks. A unit may advantageously be configured to reside on the addressable storage medium and to execute on one or more processors. Thus, a "unit" may include, by way of example, components, such as software components, object-oriented software components, class components and task components, process, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

Figure 2:
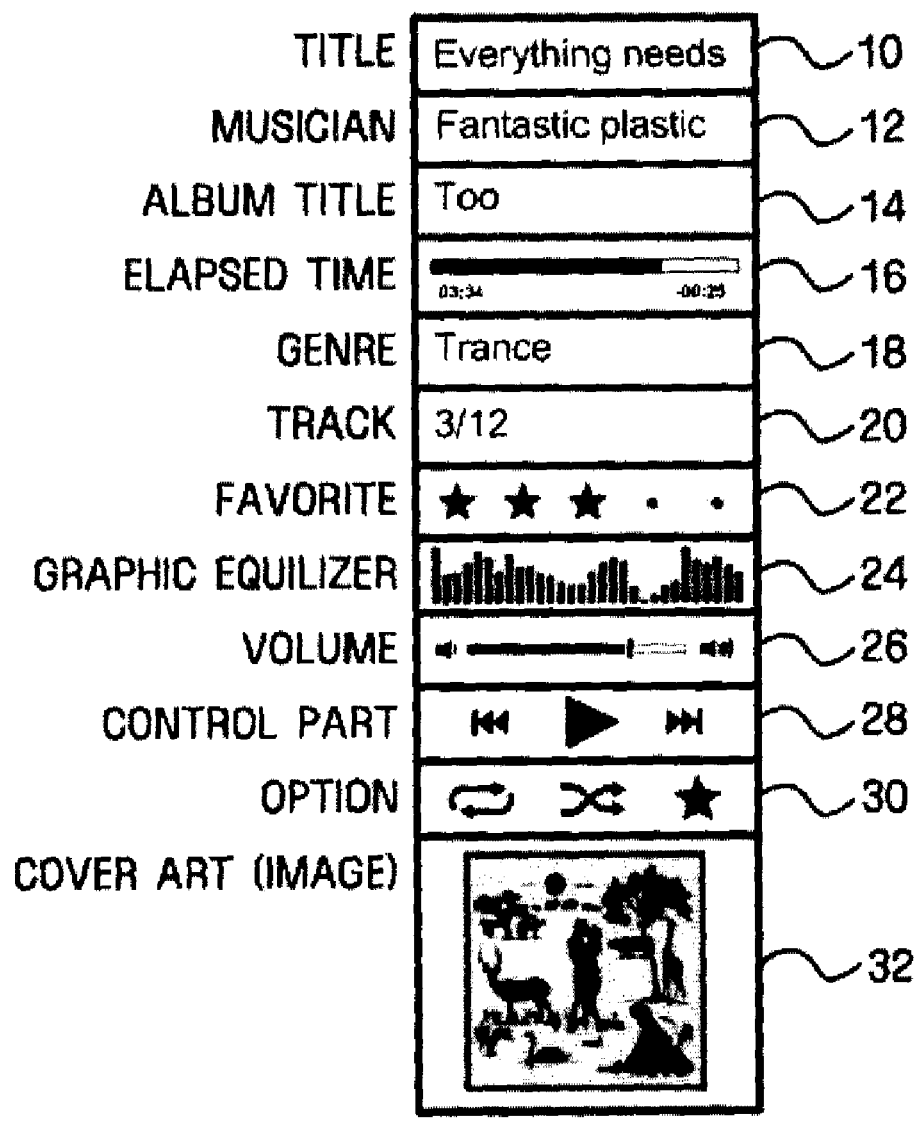
FIG. 2 illustrates types of several pieces of display information displayed on a touch screen when a music file (for example, an MP3 file) according to an exemplary embodiment of the present invention is executed.
Figure 3:
FIG. 3 illustrates the several grouped pieces of display information of FIG. 2 according to an exemplary embodiment of the present invention.
Figure 3:
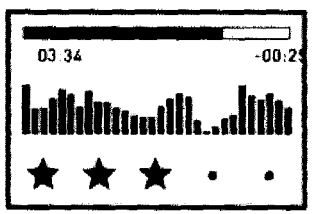
Figure 3:
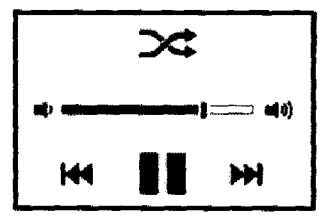

FIG. 2 illustrates types of several pieces of display information displayed on a touch screen when a music file (for example, an MP3 file) according to an exemplary embodiment of the present invention is executed, and FIG. 3 illustrates the several grouped pieces of display information of FIG. 2 according to an exemplary embodiment of the present invention.

FIG. 2 illustrates the kinds of display information displayed on the touch screen of devices when a music file is reproduced through devices such as an MP3 player or a PMP. The kinds of information include content such as a control part 28 that contains a title 10, an artist 12, an album title 14, elapsed time 16, a genre 18, a track 20, favorite 22, a graphic equalizer 24, volume 26, a play button; an option part 30 that contains repeat, one-time listening, and shuffle; and cover art (an image) 32 of an album. The music file of FIG. 2 is exemplary. The music file is not limited to this specific example and variations may be made thereto. For example, only some parts may be included in the listed content, and other different display information may be included therein.

When a moving picture or stock information are provided, different display information can be displayed on the touch screen depending on the content.

Here, when displaying on a touch screen, the display unit 130 can display several pieces of display information in groups as illustrated in FIG. 3. The display information may be grouped such that the groups include display information which has similar features. For example, information on a song, such as a title 10, an artist 12, an album title 14, and a genre 18, have similar characteristics and may be included in the same group.

FIG. 3 illustrates the display information suggested in FIG. 2 divided into first, second, and third groups. The first group (an information-display group for the currently playing song) binds title 10, singer 12, album title 14, genre 18, track 20, and cover art (image) 32 in a group; the second group (a property-display group for the currently playing songs) binds elapsed time 16, a graphic equalizer 24, favorite 22 in a group; and the third group (a sound-source-reproduction group-binds the option 30, volume 26, control portion 28 in a group. As illustrated, binding some pieces of display information among several pieces of display information is just one example. The display information can be grouped through a variety of methods or criteria. For example, the favorite 22 in the second group can be included in the first group.

Also, it is possible for users to directly select and group one of the several pieces of information in the playing device in an apparatus of an exemplary embodiment of the present invention.

Figure 4:
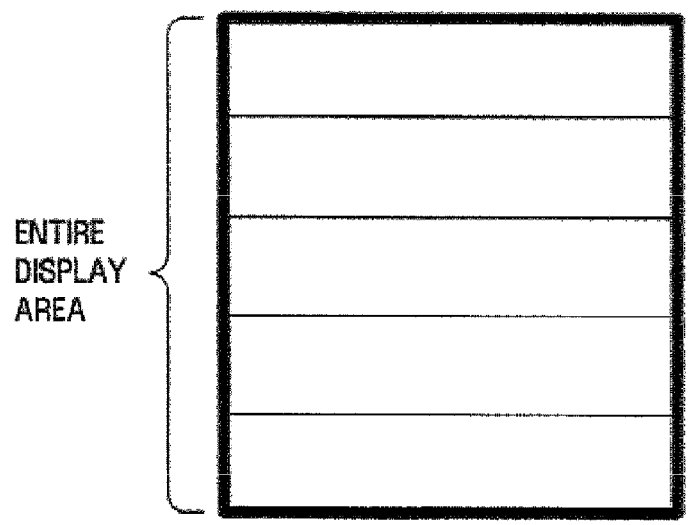
FIG. 4 illustrates that lattices are generated on a touch screen divided into five parts.
Figure 5:
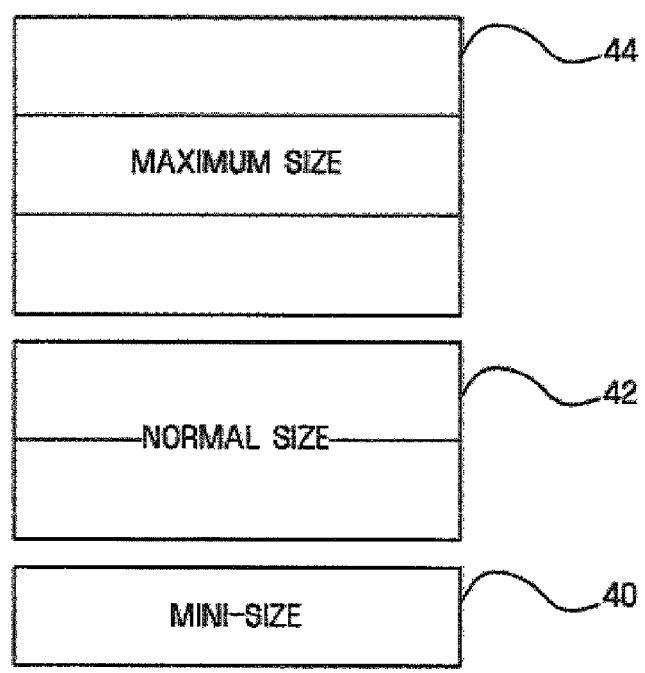
FIG. 5 illustrates regions in a lattice structure according to the size of each group according to an exemplary embodiment of the present invention.
Figure 6:
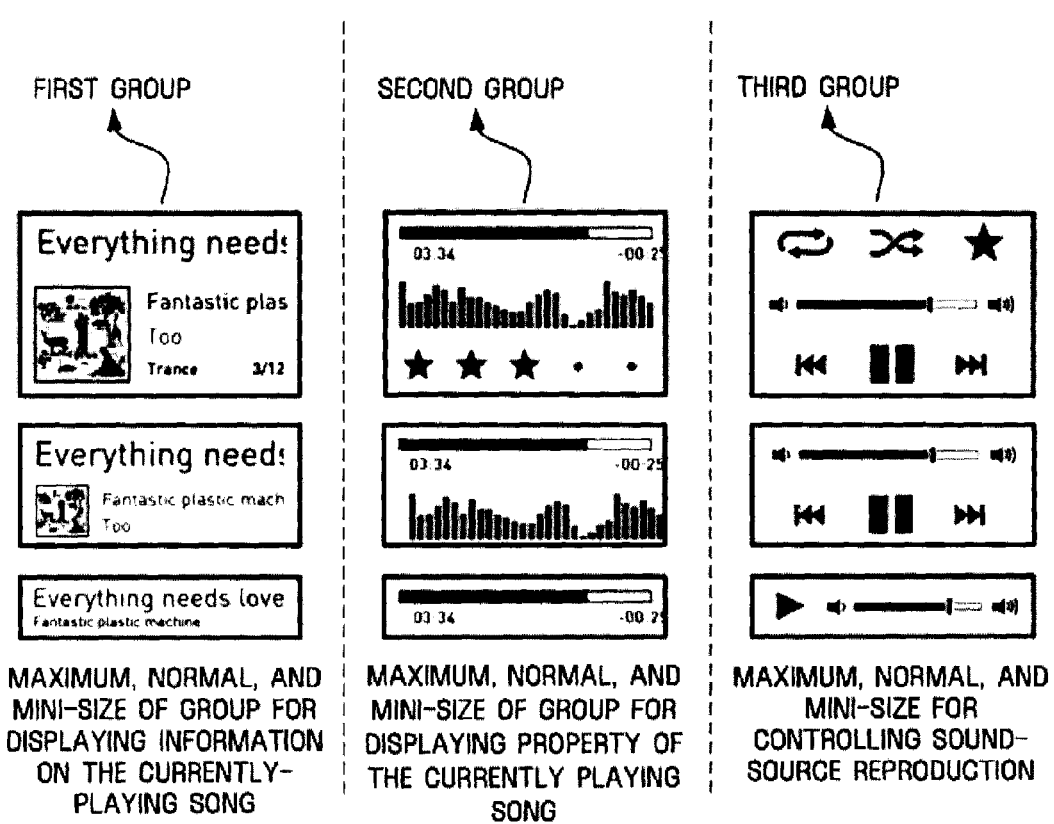
FIG. 6 illustrates the grouped display information in FIG. 3 that changes depending on the size of FIG. 5 according to an exemplary embodiment of the present invention.

FIG. 4 illustrates that lattices are generated on a touch screen divided into five parts, FIG. 5 illustrates regions in the lattice structure according to the size of each group according to an exemplary embodiment of the present invention, and FIG. 6 illustrates the grouped display information in FIG. 3 that changes depending on size of the regions of FIG. 5.

An entire touch screen area may have a lattice structure divided into a predetermined number to one direction in order to change and invariably indicate the size. FIG. 4 illustrates that the display region of the entire touch screen is vertically divided into 5 parts. FIG. 4 illustrates one example of the lattice structure divided into 5 parts, and the structure can be divided into smaller or greater numbers of lattices according to the size of display region and the number of groups of a touch screen.

Here, as illustrated in FIG. 4, the entire display region may have regular intervals.

Here, display information respectively grouped on one or more lattices in an entire display region can be displayed by the display unit 130. FIG. 5 illustrates one example. When divided into three sizes—mini 40, normal 42, and maximum 44, the grouped display information can be displayed in the region having one, two, or three lattices respectively. FIG. 6 illustrates that the grouped display information in FIG. 3 is changed and displayed according to the size. For example, the information-display group of the currently playing song (the first group) displays a title 10, a singer 12, an album title 14, a genre 18, a track 20, and a cover art (image) 32 in a display region including three lattices when the group size is maximum 44, displays a title 10, a singer 12, an album title 14, and a cover art (image) 32 in a display region including two lattices when the group size is normal 42, and displays a title 10 and a singer 12 in a display region including one lattice when the group size is mini 40.

As such, when each group size changes, the size of display information included in each group can be changed. For example, if the maximum size 44 in the first group is changed into the normal size 42, it can be recognized that the size of characters indicating the singer 12 and genre 18 reduces as well as the size of the cover art (image) 32.

Also, when the size of each group changes, the number of pieces of display information included in each group can be changed. For example, when the maximum size 44 of the first group in FIG. 6 is changed into the normal size 42 and mini-size 40, it can be recognized that six pieces of display information including a title 10, a singer 12, an album title 14, a genre 18, a track 20, a cover art (image) 32, four pieces of display information including a title 10, singer 12, genre 18, and cover art (image) 32, and two pieces of display information including a title 10 and singer 12, respectively, are displayed.

When the size of each group is reduced, due to the limitation of the space of the mini-display region, the size of characters or the number of pieces of display information may be reduced. Here, the display information which the users put the value on should be displayed, while relatively-less-significant display information should be deleted not to be displayed.

Figure 7:
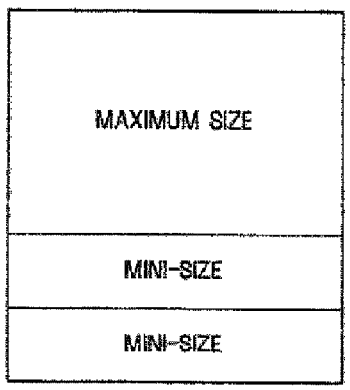
FIG. 7 illustrates that three group regions are displayed in a lattice structure divided into five parts as illustrated in FIG. 4 according to an exemplary embodiment of the present invention.
Figure 7:
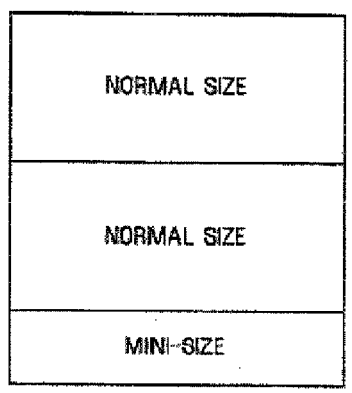
Figure 7:
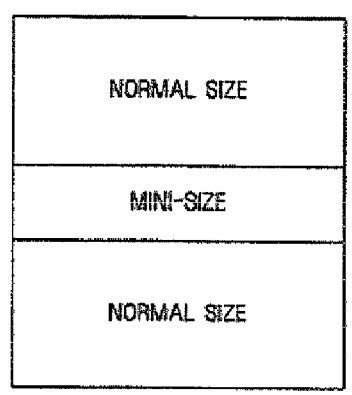
Figure 7:
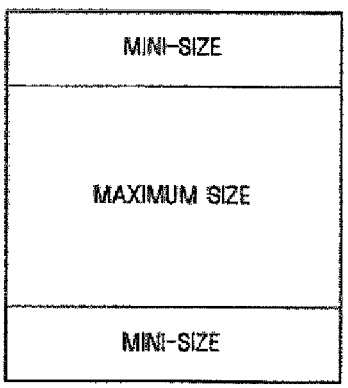
Figure 7:
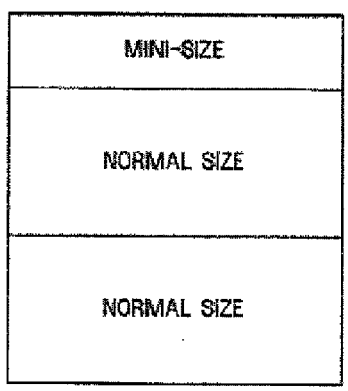
Figure 7:
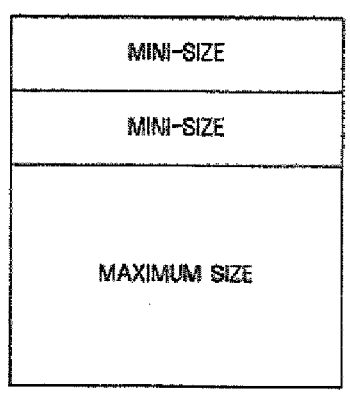
Figure 8:
FIG. 8 illustrates that, when a specified group region is input by a user according to an exemplary embodiment of the present invention, indication of the entire display region is changed.

FIG. 7 illustrates the display of three group regions in the lattice structure divided into five parts as illustrated in FIG. 4 according to an exemplary embodiment of the present invention, and FIG. 8 illustrates that, when a specified group region is input by a user according to an embodiment of the present invention, indication of the entire display region is changed.

When the entire display region is a lattice structure divided into 5 parts, as illustrated in FIG. 4, is divided into 3 groups, as illustrated in FIG. 3, and each group can be three sizes—mini 40, normal 42, and maximum 44, the screen distribution ratio used to divide the entire display region into three groups is illustrated in FIG. 7. Accordingly, it can be recognized that the number of possible cases is six. In case of a small touch screen, it is impossible to indicate display information of every group in maximum size due to the limitation of size. Therefore, if the size of a certain group increases, the size of the other group should be relatively reduced. Here, the other group region may not disappear, but the size of display information and the number of pieces of the information should be reduced by displaying the display information having high favorite so that every group can be displayed on the screen.

When the input is performed on a touch screen, the input unit 110 receives and detects the user input, the determination unit 120 determines which group was selected by detecting the input location, and the display unit 130 can display the entire group changing the detected group size. For example, the input group size can be made larger, and one of the rest of the groups can be made smaller. Here, the maximum group size among groups except the input group may be reduced. For example, when a first group and a second group are displayed as normal size, and the third group is displayed as a mini-size on a touch screen (the touch screen divided by 2:2:1 in FIG. 7), the first group size is changed into maximum size if a user inputs the first group, and the second group size, which is greater than the third group size, is changed from the normal size to the mini-size (the touch screen divided by 3:1:1 in FIG. 7).

For example, if a user touches the property display group of the currently playing song (the second group) in a first screen 151, the second group is changed from mini-size to normal size, as illustrated in a second screen 152. Here, a size of the first group is changed from maximum to normal. Next, if the user touches the second group on the second screen 152, the second group is changed from normal size to maximum size, as illustrated in a third screen 153. Here, the size of the first group is changed from normal size to mini-size. The group-size-changing on a fourth screen 154, fifth screen 155, and sixth screen 156 can be easily understood using the identical principle.

If the group input by a user is the maximum size, the input size does not increase and the size of other groups do not change.

As such, a user can obtain the detailed description of the information that he or she wants on a wider area by touching on a screen, and the information that he or she does not want can be seen by minimizing the size. When an execution area, such as a play button or a volume controlling bar, should be input, they can be input on a wider area, thereby reducing mistakes made due to malfunction.

Figure 9:
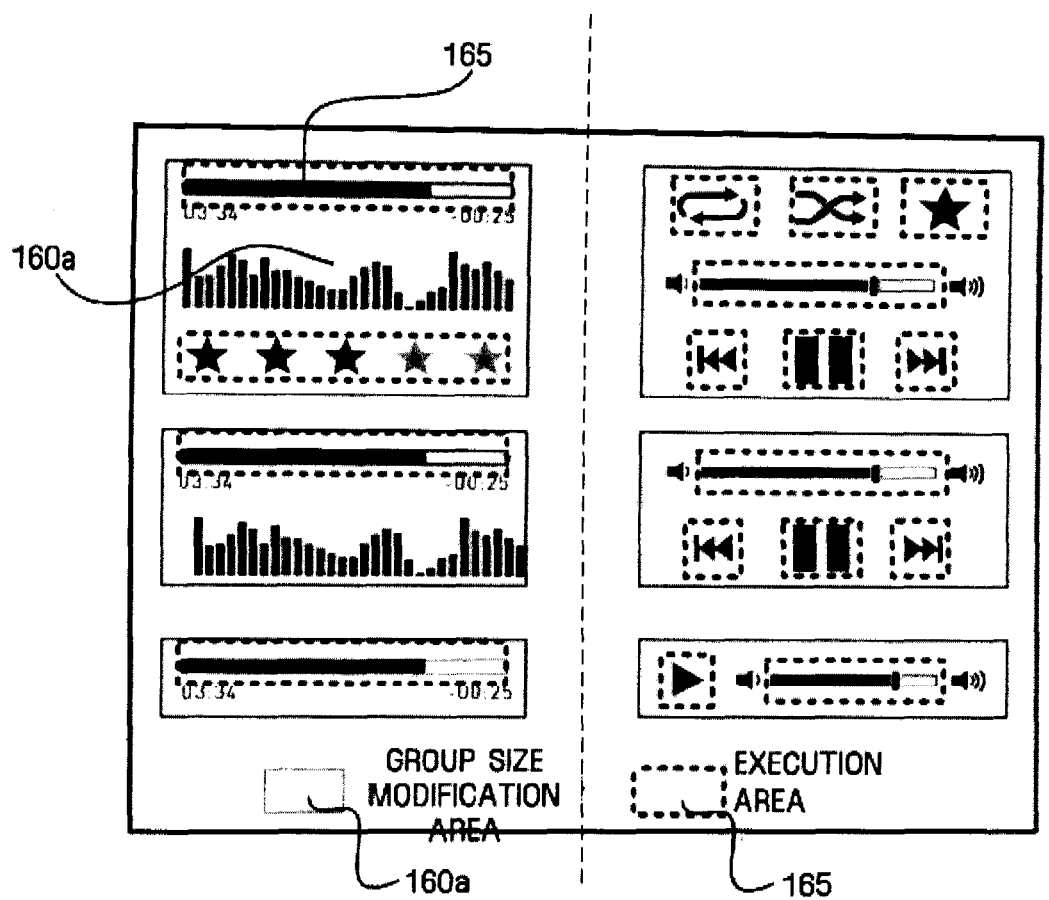
FIG. 9 illustrates the creation of a group-sized modification area and execution area according to an exemplary embodiment of the present invention.

FIG. 9 illustrates the creation of a group-size modification area and an execution area according to an exemplary embodiment of the present invention.

As illustrated in FIG. 9, each group is divided into an execution area 165 for controlling the execution according to the user's intention when the user inputs the area, such as a volume controlling bar or a play button, and a modification area 160a for changing the size of area. The execution area 165 can be formed on an area where the play button and volume controlling bar for controlling the execution are displayed on a touch screen, as illustrated in FIG. 9. The group size modification area 160a can be formed on the rest of the areas, exempting the execution area formed in the group area. Therefore, the entire group area is divided into the execution area 165 and the group size modification area 160a. When the user inputs on a screen, as mentioned above, the determination unit 120 determines if the input occurred on the execution area 165 or the group size modification area 160a.

Figure 10:
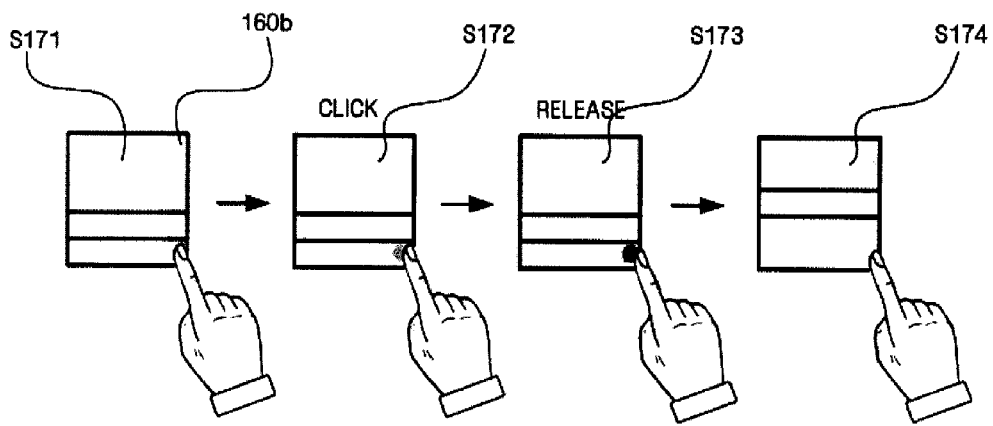
FIG. 10 illustrates the expansion of a group-size modification area and the group size formed at a certain location in a group region.

FIG. 10 illustrates the expansion of a group-size modification area and the group size formed at a certain location in a group region.

According to FIG. 9, the group size modification area 160a is formed on the rest of the area, exempting the execution area 165. However, according to FIG. 10, a group size modification area 160b is formed on a predetermined area in a group. In the drawings, the group size modification area 160b is formed on the end portion of right in each group. The description of the execution area 165 is identical to the contents mentioned above with reference to FIG. 9.

When the user selects the group to be input by a user S171, and clicks (inputs) the group size modification area 160b formed on end portion of right formed at the bottom of a touch screen S172, it can be recognized that when the click is released S173, the size of the selected group increases (to normal size) S174. Here, the size of the group at the top of the groups, which is the larger of the remaining two groups, is reduced.

Figure 11A:
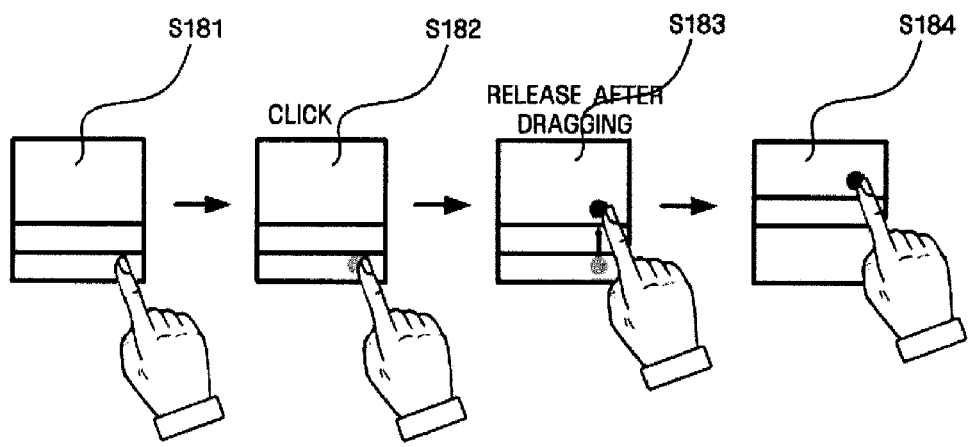
FIG. 11a illustrates the expansion of a group size according to another exemplary embodiment of the present invention.
Figure 11B:
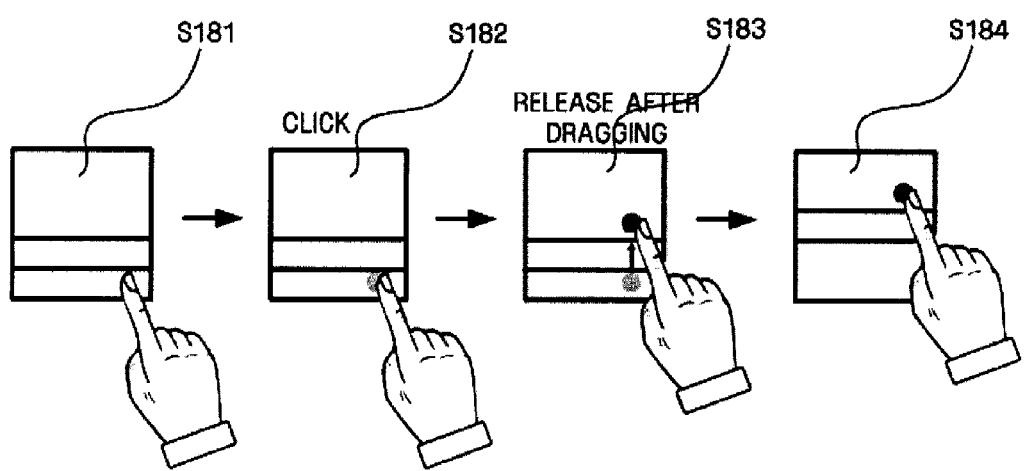
FIG. 11b illustrates the selection of an execution area according to yet another exemplary embodiment of the present invention.

FIG. 11a illustrates that the group size according to another embodiment of the present invention is expanded, and FIG. 11b illustrates that an execution area according to yet another embodiment of the present invention is clicked and performed.

The content of the execution area 165 is identical to the content mentioned above with reference to FIG. 9. Here, additional group size modification area is not created, but it is formed only in the execution area 165 as mentioned above.

FIG. 11a illustrates a series of processes for changing the group size, the processes include: selecting a group to be input by a user S181, clicking a certain group S182 and dragging it in a predetermined direction (upward according to the drawing), and releasing the button S183. Then, the size of the first-selected area increases S184. This process is similar to that of operating the execution area 165 where a volume controlling bar is formed therein by clicking, dragging, and releasing a cursor. Here, the cursor may be dragged in a different direction from that of operating the volume controlling bar (normally left or right). Expanding the region by clicking, dragging, and releasing the cursor to the left or right might create confusion because it is difficult to determine if the user input was performed to expand the group region or if is was performed to control the volume when the input was performed on a volume-controlling bar.

Further, when double-clicking a specified group region, the size of the group region can be increased.

Here, as illustrated in 11b, the corresponding button can be executed after clicking and releasing the button in the execution area 165. When the user selects the execution area (play button, volume controlling bar, and the like) S191, clicks the execution area S192 and releases the button S193, the play button, volume controlling bar, and the like are executed according to the input execution area.

Figure 12:
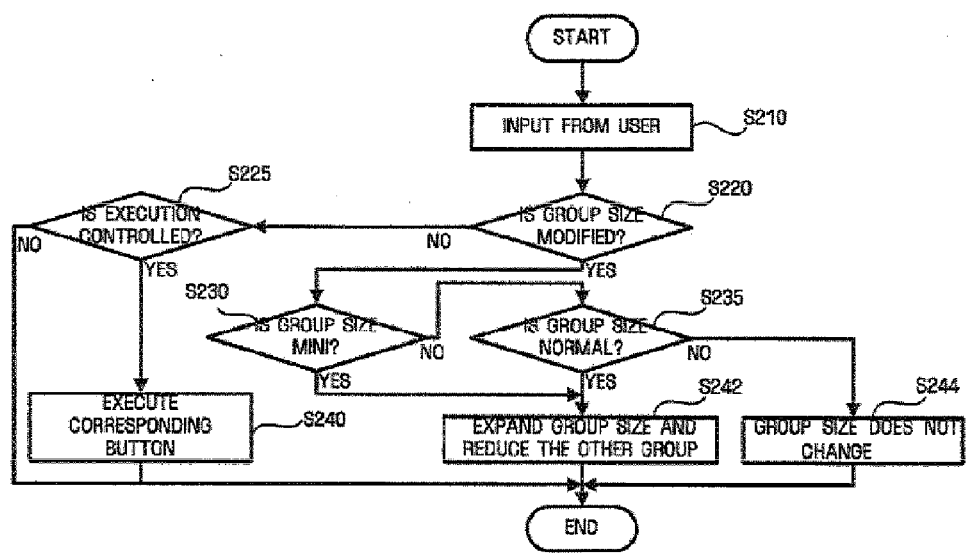
FIG. 12 is a flowchart illustrating a sequence of a device operating after an input is performed by a user according to an exemplary embodiment of the present invention.

FIG. 12 is a flowchart illustrating the sequence of a device operating after an input is performed by a user according to an exemplary embodiment of the present invention.

As mentioned above, FIG. 12 illustrates the processes for the area size to be three sizes—mini, normal, or maximum.

First, when the user inputs on a touch screen, the input unit 110 detects the input S210. The determination unit 120 determines which group was selected, and then determines if the user input was for changing the area size S220 or for controlling the execution S225. If the user input is determined to control the execution, the clicked button or the dragged bar are executed according to the user's input S240. If the user input is determined to change the region size and the region size is mini S230 or normal S235, the display unit 130 expands the input region size and, simultaneously, reduces the other region area S242. Even though the user input was for changing the region size, every region size does not change if the region size is maximum S244.

Hereinafter, the description of an apparatus for displaying the variable-sized, grouped information on a touch screen according to an embodiment of the present invention will follow.

Figure 13:
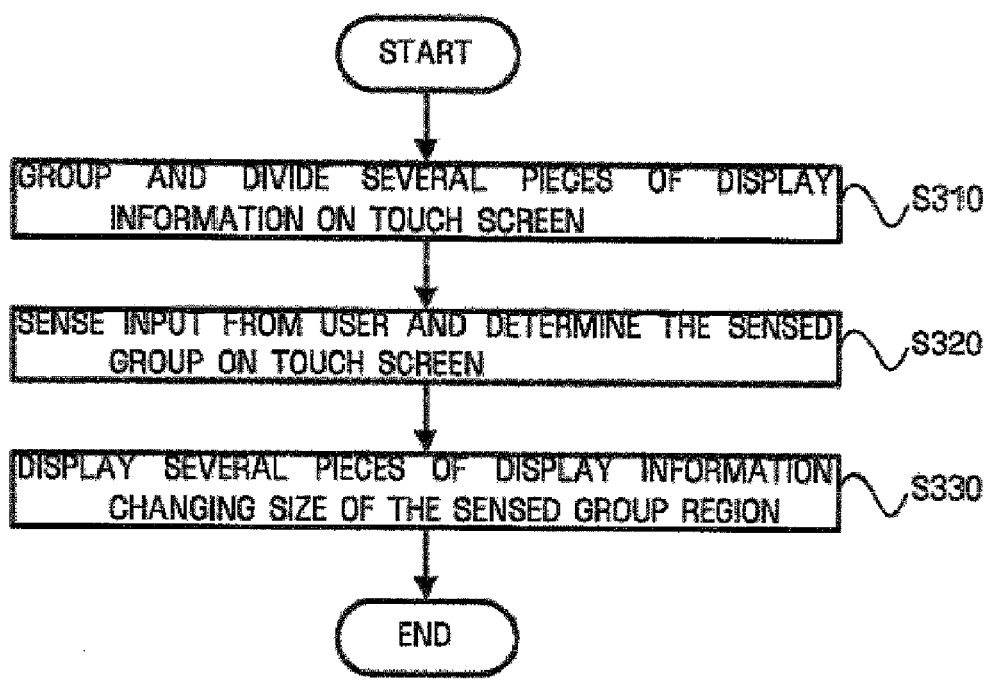
FIG. 13 is a flowchart illustrating a method of displaying variable-sized, grouped information on a touch screen according to an exemplary embodiment of the present invention.

FIG. 13 is a flowchart illustrating a method of displaying the variable-sized, grouped information on a touch screen according to an embodiment of the present invention.

First, the display unit 130 can display several pieces of display information by grouping and dividing them in a predetermined number of group regions on a touch screen S310. Here, the display information having similar features may be grouped. A touch screen may be a lattice structure where the entire region is divided into a predetermined number of specific directions, and the grouped display information can be displayed on one or more divided regions respectively. The intervals may be regularly divided when the touch screen is divided into a lattice structure.

After receiving the user input by the input unit 110, the determination unit 120 can determine which group was selected by calculating the input location on the entire touch screen S320.

Next, the display unit 130 changes the size of the input group and displays several pieces of display information according to the result of the determination from the determination unit 120 S330. The display unit 130 can control size of the input group region to be larger, and one of the size among the rest groups to be smaller. Here, if the size of the input group region is the predetermined maximum size, the entire screen can be maintained without any change of the size. When the region size is changed, the display unit 130 can change the size of the display information included in each group. In addition, when the region size is changed, the display unit 130 can change the number of pieces of display information included in each group.

Figure 14:
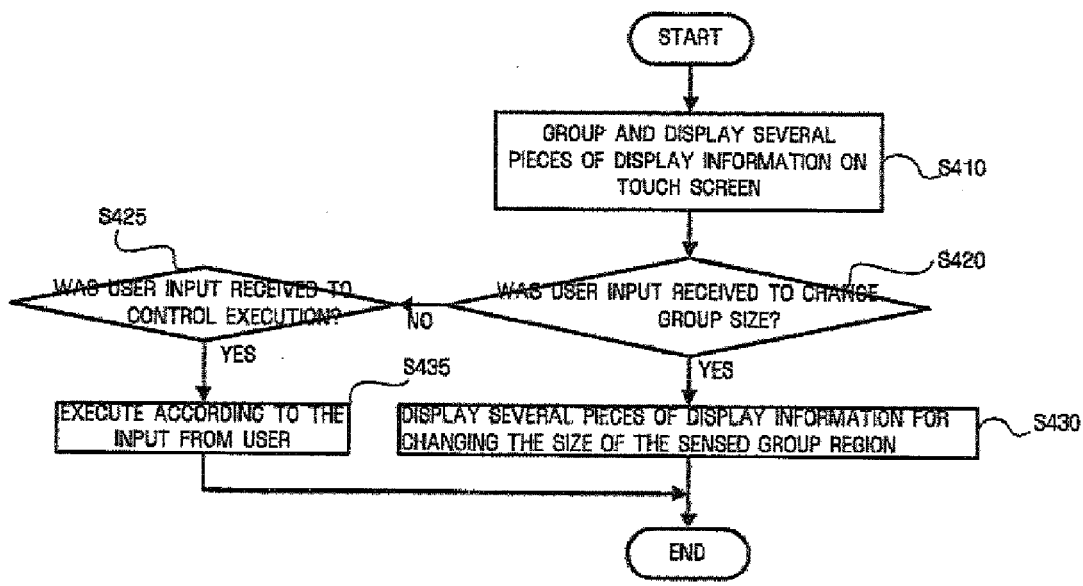
FIG. 14 is a flowchart illustrating a method of displaying the variable-sized, grouped information on a touch screen according to another exemplary embodiment of the present invention.

FIG. 14 is a flowchart illustrating a method of displaying the variable-sized, grouped information on a touch screen according to another embodiment of the present invention.

First, as mentioned above with reference to FIG. 13, the display unit 130 can display several pieces of display information by grouping and dividing them in a predetermined number of group regions S410.

Next, after the input unit 110 senses the user input, the determination unit 120 can determine if the user input was performed to control the execution S425 or to change the region size S420. The group region is divided into the execution area 165 for controlling the execution and the group size modification area 160 formed on the rest of the area. If the execution area 165 is sensed, the determination unit 120 determines that the input was performed to control the execution, and if the group size modification area 160 is sensed, the determination unit 120 determines that the input was performed to change the region size. Further, the execution area 165 for controlling the execution and the group size modification area 160 are formed at a predetermined location in a group region. The determination unit 120 determines that the input was performed to control the execution if the execution area 165 is sensed, and it determines that the input was performed to change the region size if the group size modification 160 is sensed. In addition, the execution area 165 for controlling the execution is formed in a group region. The determination unit 120 determines that the input was performed to control the execution if the execution area 165 is sensed, and it determines that the input was performed to change the region size if selecting (clicking) a predetermined group and dragging it in a predetermined direction is sensed.

If the determination 120 determines that the input was performed to control the execution, a button formed on the execution area 165 can be executed according to the user input S435. In addition, if the determination unit 120 determines that the input was performed to change the region size, the display unit 130 displays several pieces of display information changing the size of the sensed group region S430.

Exemplary embodiments of the present invention have been described for illustrative purposes, and those skilled in the art will appreciate that various modifications, additions and substitutions are possible without departing from the scope and spirit of the invention as disclosed in the accompanying claims. Therefore, the scope of the present invention should be defined by the appended claims and their legal equivalents.

As described above, the method and apparatus for displaying variable-sized, grouped display information on touch screen produces one or more of the following effects.

First, the users can obtain information by expanding the size of the information (s)he is interested in, and reducing the size of the information (s)he is not interested in by a simple input.

Second, the group region that a user is interested can be expanded to input the execution area, thereby avoiding misoperations.

What is claimed is:

1. An apparatus for displaying variable-sized, grouped display information on a touch screen, the apparatus comprising:
    an input unit that receives an input from a user on a touch screen on which several pieces of display information are grouped and displayed in a plurality of groups;
    a determination unit that determines which of the plurality of groups was input by calculating a location on the touch screen corresponding to the user input and determines if the input is within a group-size modification area of the group which was input; and
    a display unit that displays the several pieces of display information in groups, and changes a size of a region of the group which was input if the determination unit determines that the input was within the group-size modification area of the group which was input while a size of a region of at least one other of the plurality of groups changes corresponding to the size of the region of the group which was input,
    wherein each group region is divided into an execution area which controls execution of multimedia content and the group-size-modification area and wherein the execution area is within the group-size modification area, and the input within the execution area is of a same type as the input within the group-size modification area,
    wherein the display unit decreases the size of the region of the at least one other of the plurality of groups which is lamest among the other of the plurality of groups to the next smaller size.

2. The apparatus of claim 1, wherein the touch screen is divided into a plurality of lattices, and the grouped display information is respectively displayed in one or more of the plurality of lattices.

3. The apparatus of claim 2, wherein the touch screen is divided at regular intervals.

4. The apparatus of claim 1, wherein the display unit displays the size of the input group region larger, and the region of the at least one other of the plurality of groups smaller.

5. The apparatus of claim 4, wherein the display unit does not change the size of each group region when the size of the input group region is maximum.

6. The apparatus of claim 1, wherein the display unit changes the size of the display information included in each group region when the size of each group region is changed.

7. The apparatus of claim 1, wherein the display unit changes a number of pieces of information included in each group region when the size of each group region is changed.

8. The apparatus of claim 1, wherein the apparatus executes a function corresponding to an execution control if the determination unit determines that the location on the touch screen corresponding to the user input corresponds to the execution area, and the size of the input group region is changed if the determination unit determines that the location on the touch screen corresponding to the user input corresponds to the group-size-modification area.

9. The apparatus of claim 1, wherein each group region has an execution area which controls execution and the group-size-modification area at a certain position in the group region for modifying sizes of the group regions, the function corresponding to the execution area is executed if the determination unit determines that the location on the touch screen corresponding to the user input corresponds to the execution area, and the size of the input group region is changed if the determination unit determines that the location on the touch screen corresponding to the user input corresponds to the group-size-modification area.

10. The apparatus of claim 1, wherein each group region has an execution area which controls execution, a function corresponding to an execution area is executed if the determination unit determines that the location on the touch screen corresponding to the user input corresponds to the execution area, and the size of the input group region is changed if the determination unit determines that the user input comprises selecting the group-size modification area and dragging it.

11. The apparatus of claim 1, wherein the display unit displays the groups in one of a plurality of preset sizes, and the display unit increases the size of a region of the group which was input to the next larger size among the plurality of preset sizes and decreases the size of the region of the at least one other of the plurality of groups to the next smaller size among the plurality of preset sizes.

12. The apparatus of claim 1, wherein the display unit displays the groups in a non-overlapping form in one of at least three different preset sizes.

13. A method of displaying variable-sized, grouped display information on a touch screen, the method comprising:
grouping several pieces of display information and dividing them into a plurality of group regions on the touch screen;
receiving an input corresponding to one group region selected among the plurality of group regions on the touch screen;
determining if the input is within a group-size-modification area of the group region which was input; and
changing a size of the one group region if it is determined that the input is within the group-size modification area of the one group region which was input while a size of at least one other of the plurality of group regions changes corresponding to the changing of the size of the one group region,
wherein each group region is divided into an execution area which controls execution of multimedia content and the group-size-modification area wherein the execution area is within the group-size modification area, and the input within the execution area is of a same type as the input within the group-size modification area
wherein the decreasing of the size of the at least one other of the plurality of group regions comprises decreasing the size of the at least one other of the plurality of group regions which is lamest among the other of the plurality of group regions.

14. The method of claim 13, wherein the touch screen is divided into a plurality of lattices, and the grouped display information is respectively displayed on one or more of the plurality of lattices.

15. The method of claim 14, wherein the touch screen is divided at regular intervals.

16. The method of claim 13, wherein changing the size comprises displaying the size of the input group region larger and the at least one other of the plurality of groups smaller on the touch screen.

17. The method of claim 16, wherein the size of each group is not changed when the size of the input group region is maximum during the changing.

18. The method of claim 13, wherein the size of the display information included in each group region is changed when the size of each group region is changed.

19. The method of claim 13, wherein a number of pieces of information included in each group region is changed when the size of each group region is changed.

20. The method of claim 13, wherein the changing of the size comprises changing the size of the one group region to one of a plurality of preset sizes, and increasing the size of the one group region to the next larger size among the plurality of preset sizes and decreasing the size of the at least one other of the plurality of group regions to the next smaller size among the plurality of present sizes.

21. The method of claim 13, wherein the group regions are displayed in a non-overlapping form in one of at least three different preset sizes.

22. A method of displaying variable-sized, grouped display information on a touch screen, the method comprising:
grouping several pieces of display information and dividing them into a plurality of group regions on the touch screen;
receiving information on at least one of execution control or a change of a group region size of at least one of the plurality of group regions based on a location of an input on the touch screen; and
performing a function corresponding to the execution control if the receiving information comprises receiving the input within an execution area for controlling execution, or changing the group region size of the at least one of the plurality of group regions if the receiving information comprises receiving the input within a group-size modification area, wherein each group region is divided into an execution area which controls execution of multimedia content and the group-size-modification area,
wherein the execution area is within the group-size modification area, and wherein the input within the execution area is of a same type as the input within the group-size modification area,
wherein the decreasing of the size of the at least one other of the plurality of group regions comprises decreasing the size of the at least one other of the plurality of group regions which is lamest among the other of the plurality of group regions.

23. The method of claim 22, wherein each group region is divided into the execution area and the group-size-modification area comprising the rest of the group region.

24. The method of claim 22, wherein the function corresponding to the execution control is executed if information is received on the execution area, and wherein the size of the at least one of the plurality of group regions is changed if the information received comprises a user selecting the execution area and dragging the execution area along the touch screen.

25. The method of claim 22, wherein the touch screen is divided into a plurality of lattices, and the grouped display information is respectively displayed in one or more of the plurality of lattices.

26. The method of claim 25, wherein the touch screen is divided at regular intervals.

27. The method of claim 22, wherein if the receiving information comprises receiving information on the change of the group region size of at least one of the plurality of group regions, the size of the at least one of the group regions is displayed larger and sizes of the other group regions are displayed smaller.

28. The method of claim 27, wherein the size of each group region is not changed when the size of the group region on which information is received is maximum.

29. The method of claim 22, wherein the size of display information included in each group is changed when the size of each group region is changed.

30. The method of claim 22, wherein a number of pieces of display information included in each group is changed when the size of each group is changed.

31. The method of claim 22, wherein the function corresponding to the execution control is executed when the user selects the execution area and drags it in a predetermined direction; and
wherein the at least one of the plurality of group regions is changed if the information received comprises the user selecting the execution area and dragging it along the touch screen in a direction that is different from the predetermined direction.

32. The method of claim 22, wherein the changing of the group region size comprises changing the size of the at least one of the group regions to one of a plurality of preset sizes, and increasing the size of the at least one group region to the next larger size among the plurality of preset sizes and decreasing the size of at least one other of the plurality of group regions to the next smaller size among the plurality of preset sizes.

33. The method of claim 22, wherein the group regions are displayed in a non-overlapping form in one of at least three different preset sizes.

* * * * *